(12) United States Patent
Jansen Van Nieuwenhuizen

(10) Patent No.: US 12,482,611 B2
(45) Date of Patent: Nov. 25, 2025

(54) NANOCOMPOSITE MATERIAL FOR ENERGY STORAGE DEVICES

(71) Applicant: SOLZEN ENERGY (PTY) LTD., Gauteng (ZA)

(72) Inventor: André Jansen Van Nieuwenhuizen, Gauteng (ZA)

(73) Assignee: SOLZEN ENERGY (PTY) LTD., Midrand (ZA)

( * ) Notice: Subject to any disclaimer, the term of this patent is extended or adjusted under 35 U.S.C. 154(b) by 252 days.

(21) Appl. No.: 18/570,090

(22) PCT Filed: Jun. 13, 2022

(86) PCT No.: PCT/IB2022/055455
§ 371 (c)(1),
(2) Date: Dec. 14, 2023

(87) PCT Pub. No.: WO2022/264001
PCT Pub. Date: Dec. 22, 2022

(65) Prior Publication Data
US 2024/0312728 A1 Sep. 19, 2024

(30) Foreign Application Priority Data
Jun. 14, 2021 (ZA) .................. 2021/04057

(51) Int. Cl.
*H01G 11/48* (2013.01)
*B82Y 30/00* (2011.01)
(Continued)

(52) U.S. Cl.
CPC ............ *H01G 11/48* (2013.01); *H01G 11/26* (2013.01); *H01G 11/36* (2013.01); *H01G 11/46* (2013.01);
(Continued)

(58) Field of Classification Search
CPC ........ H01G 11/48; H01G 11/26; H01G 11/36; H01G 11/46; H01G 11/60; H01G 11/62; B82Y 30/00
See application file for complete search history.

(56) References Cited

U.S. PATENT DOCUMENTS

2004/0262636 A1* 12/2004 Yang .................. B82Y 30/00
257/E21.108
2005/0219798 A1 10/2005 Higono et al.
(Continued)

FOREIGN PATENT DOCUMENTS

KR 10-2020-0053180 5/2020

OTHER PUBLICATIONS

International Search Report (ISR) and Written Opinion (WO) mailed on Sep. 23, 2022 in connection with International Application No. PCT/IB2022/055455, 10 pages.
(Continued)

*Primary Examiner* — Michael P Mcfadden
(74) *Attorney, Agent, or Firm* — DiPerna Law Firm, P.C.; Raymond Diperna

(57) ABSTRACT

The invention relates to a nanocomposite material for an electrode of an energy storage device. The nanocomposite material comprises carbon nanotubes and nanoparticles of transitional metal oxides selected from a group of lanthanide oxides, incorporated in a matrix, wherein the nanocomposite material has a plurality of pores adapted to adsorb ions from an electrolyte.

28 Claims, 3 Drawing Sheets

(51) Int. Cl.
  *H01G 11/26* (2013.01)
  *H01G 11/36* (2013.01)
  *H01G 11/46* (2013.01)
  *H01G 11/60* (2013.01)
  *H01G 11/62* (2013.01)

(52) U.S. Cl.
  CPC ............ *H01G 11/60* (2013.01); *H01G 11/62* (2013.01); *B82Y 30/00* (2013.01)

(56) References Cited

U.S. PATENT DOCUMENTS

| | | | | |
|---|---|---|---|---|
| 2006/0142149 A1* | 6/2006 | Ma | ............... | B01J 23/42 423/447.3 |
| 2008/0223795 A1* | 9/2008 | Bakajin | ............... | B01D 69/04 977/750 |
| 2008/0279752 A1* | 11/2008 | Suzuki | ............... | D01F 9/133 977/750 |
| 2011/0220574 A1* | 9/2011 | Bakajin | ............... | B01D 69/148 977/902 |
| 2013/0108826 A1* | 5/2013 | Chakravarthi | ...... | H01B 13/0036 428/221 |
| 2013/0299732 A1* | 11/2013 | Kwak | ............... | H01F 1/28 252/62.51 R |
| 2016/0301084 A1* | 10/2016 | Gendel | ............... | B01D 69/04 |
| 2017/0162338 A1 | 6/2017 | Buehler et al. | | |
| 2017/0307602 A1* | 10/2017 | Tang | ............... | G01N 33/48721 |
| 2019/0115164 A1* | 4/2019 | Tang | ............... | H01G 11/24 |
| 2020/0343535 A1* | 10/2020 | Yang | ............... | H01M 4/0471 |

OTHER PUBLICATIONS

International Preliminary Report on Patentability (IPRP) issued on May 9, 2024 in International Application No. PCT/IB2022/055455 (4 pages).

* cited by examiner

NANOCOMPOSITE MATERIAL FOR ENERGY STORAGE DEVICES

CROSS-REFERENCE TO RELATED APPLICATIONS

This application is a National Phase application under 35 U.S.C. 371 of International Application No. PCT/IB2022/055455 filed on Jun. 13, 2022, which application is based upon and claims the benefit of priority from South African Patent Application No. 2021/04057 filed on Jun. 14, 2021, the disclosures of each of which are incorporated herein in their entireties by reference.

FIELD OF INVENTION

The invention is in the field of energy storage devices, in particular capacitors, more in particular supercapacitors, even more in particular ultracapacitors. The invention particularly extends to electrodes used in energy storage devices and extends to surface modifications on electrodes to increase the energy density capacities of the energy storage devices. The invention extends to a nanocomposite material (i.e. an active storage layer). The invention further extends to a method of producing the nanocomposite material and an electrode comprising the nanocomposite material.

BACKGROUND OF INVENTION

Supercapacitors store ionic charge electrostatically at the interface of high surface area electrodes, such as activated carbon electrodes, in a liquid electrolyte composition. Efforts to increase the energy density of supercapacitors have focused mainly on developing higher surface area electrodes. Although the energy density of supercapacitors should be directly linked to the surface area of the electron storage layer, in practice this is not achieved.

The inventors have undertaken extensive studies to determine the causality of this phenomenon. It was found that various reasons exist that prevent these storage layers from obtaining the optimum theoretical maximum capacity.

The present invention seeks to address this phenomenon.

SUMMARY OF INVENTION

IN THIS SPECIFICATION, the term "nanocomposite material" means a material matrix/binder, optionally with a stabilizing agent, that incorporates nanoparticles of two or more desired materials. In turn, "nanoparticles" means nano-sized particles.

IN THIS SPECIFICATION, the terms "pores" and "interstices" are used interchangeably and refer to the same thing. These terms refer to voids which permit liquid, in particular electrolytes carrying ions, to be received through the pores.

FURTHERMORE, IN THIS SPECIFICATION, the terms "binder" and "matrix" are used interchangeably and are synonymous.

FURTHERMORE, IN THIS SPECIFICATION, the term microporous refers to a pore size that is less than 2 nm in diameter, and the term mesoporous refers to a pore size that is between 2 nm and 50 nm in diameter.

FURTHERMORE, IN THIS SPECIFICATION, the term nanocomposite material and active layer are used interchangeably and are synonymous.

FURTHERMORE, IN THIS SPECIFICATION, the term "wet nanocomposite material" essentially means the nanocomposite material which has a matrix in liquid form and which matrix has not been subjected to a solidification process such as curing. Accordingly, the term "cured nanocomposite material" essentially means that the matrix has been solidified or substantially solidified, and therefore the term "cured nanocomposite" refers to the nanocomposite material in accordance with the invention.

IN ACCORDANCE WITH A FIRST ASPECT OF THE INVENTION THERE IS PROVIDED a nanocomposite material, in particular a mesoporous nanocomposite material including nanocomposite particles of carbon nanotubes and transitional metal oxides selected from a group of lanthanide oxides, incorporated in a matrix, wherein the nanocomposite material has a plurality of interstices/pores that are adapted to receive liquid, typically an electrolyte, and act as storage sites for electrons/ions.

The nanocomposite material may be a microporous-mesoporous nanocomposite material, preferably a mesoporous nanocomposite material.

The matrix may be conductive.

The matrix may be a polymer matrix selected from a group of organic polymers (such as polyacetylene, and polypyrrole), conducting polymers (such as polyindole, and polyaniline) and polymer mixtures of two or more ionomers, and copolymers thereof.

Preferably, the polymer matrix may be a polymer mixture comprising of (3,4-ethylenedioxythiophene) polystyrene sulfonate (PEDOT:PSS).

The polymer matrix may further comprise a stabilizing agent.

The stabilizing agent may comprise polyethylene, an organic cellulose comprising sodium carboxymethyl cellulose (CMC), or a mixture of polyethylene and sodium carboxymethyl cellulose.

The nanocomposite material may comprise between about 50-90 wt % of carbon nanotubes (CNTs) and 10 to 50 wt % cerium oxide ($CeO_2$), and the matrix, preferably PEDOT:PSS, may be between about 0.5 to 8 wt % the total mass of the carbon nanotubes and $CeO_2$.

More specifically, the nanocomposite material comprises between about 65 to 75 wt % of carbon nanotubes (CNTs) and 25 to 35 wt % cerium oxide ($CeO_2$) and the binder, preferably PEDOT:PSS, may be between about 1 to 3 wt % the total mass of the CNTs and $CeO_2$.

The nanocomposite material may have a high Brunauer-Emmett-Teller (BET) specific surface area of between 65 $m^2/g$ and 2300 $m^2/g$.

The interstices may be mixture of micro-pores and meso-pores, in particular the interstices may have an average diameter size that may range between 0.2 to 20 nm, preferably between 1 and 15 nm, more preferably between 2 nm and 10 nm.

The pores may be universally distributed throughout the surface of the nanocomposite material and may extend through the thickness of the nanocomposite material.

The pores may be defined between neighbouring CNTs.

The nanocomposite material may comprise an arrangement of irregular and entangled CNTs.

The pores/interstices may be equivalent to, in particular fractionally larger than, the size of ions in an electrolyte for use with an electrode of an energy storage device, such as a supercapacitor/ultracapacitor.

IN ACCORDANCE WITH A SECOND ASPECT OF THE INVENTION THERE IS PROVIDED a method for producing a nanocomposite material, the method comprising mixing nanoparticles of carbon nanotubes and transitional metal oxides selected from a group of lanthanide oxides, with a matrix.

The mixing may include dispersing the nanoparticles of carbon nanotubes and transitional metal oxides selected from a group of lanthanide oxides in a matrix, in particular a polymer matrix.

The polymer matrix may optionally comprise of a stabilizing agent.

The method may further include the step of curing the matrix thus forming the nanocomposite material.

IN ACCORDANCE WITH A THIRD ASPECT OF THE INVENTION THERE IS PROVIDED an electrode having at least one surface comprising a nanocomposite material comprising nanoparticles of carbon nanotubes and nanoparticles of transitional metal oxides selected from a group of lanthanide oxides, incorporated in a matrix, wherein the nanocomposite material has a plurality of interstices having a size equivalent to the size of ions of a suitable electrolyte.

The lanthanide oxide may include cerium oxide.

The matrix may be a polymer matrix selected from a group of organic polymers (such as polyacetylene, and polypyrrole), conducting polymers (such as polyindole, and polyaniline), polymer mixtures of two or more ionomers, and copolymers thereof.

Preferably, the polymer matrix may be a polymer mixture comprising of (3,4-ethylenedioxythiophene) polystyrene sulfonate (PEDOT:PSS).

The electrode may comprise a substrate comprising substantially of aluminium (Al), gold (Au), silver (Ag), copper (Cu), nickel (Ni), platinum (Pt), or palladium (Pd), but preferably aluminium.

The substrate may be in the form of a foil.

The substrate may be surface oxidized or not surface oxidized, preferably the substrate may have an oxidized surface layer.

The substrate may have a thickness of about 0.01 mm.

The nanocomposite material may cover a surface of the substrate that has the oxidized or non-oxidized surface layer. In particular, the nanocomposite material may cover opposite surfaces of the substrate and either one or both surfaces may be oxidized or non-oxidized.

The polymer matrix selected from a group of organic polymers (such as polyacetylene, and polypyrrole), conducting polymers (such as polyindole and polyaniline), polymer mixtures of two or more ionomers, and copolymers thereof.

Preferably, the polymer matrix may be a polymer mixture comprising of (3,4-ethylenedioxythiophene) polystyrene sulfonate (PEDOT:PSS).

The polymer matrix may further comprise a stabilizing agent.

The stabilizing agent may comprise polyethylene oxide or an organic cellulose comprising sodium carboxymethyl cellulose (CMC), or a combination of both.

The nanocomposite material may comprise between about 50-90 wt % of carbon nanotubes and 10 to 50 wt % $CeO_2$ and the matrix, preferably PEDOT:PSS, may be between about 0.5 to 8 wt % the total mass of the carbon nanotubes and nanoparticles of $CeO_2$.

More specifically, the nanocomposite material may comprise between about 65 to 75 wt % of carbon nanotubes and 25 to 35 wt % $CeO_2$ nanoparticles, and the matrix, preferably PEDOT:PSS, may be between about 1 to 3 wt % the total mass of the CNTs and $CeO_2$ nanoparticles.

The nanocomposite material may have a high BET specific surface area of between 65 and 2300 $m^2/g$.

The interstices may comprise a mixture of micro-pores and meso-pores, in particular the interstices may have an average diameter size that may range between 0.2 to 20 nm, preferably between 1 and 15 nm, more preferably between 2 nm and 10 nm.

The pore sizes may be universally distributed throughout the surface of the nanocomposite material and may extend through the thickness of the nanocomposite material.

The pore sizes may be equivalent to, in particular fractionally larger than, the size of ions in the electrolyte for use with the electrode. In other words, the pore sizes may be of an adequate size to permit an electrolyte carrying ions to pass through and be received into the pores of the nanocomposite material.

The electrolyte suitable for use with the electrode or matched with the electrode defined above may be selected from a group consisting of propylene carbonate, in particular anhydrous propylene carbonate, dimethyl carbonate, in particular anhydrous dimethyl carbonate, and a quaternary ammonium salt based on spiro-(1,1')-bipyrolidinium tetrafluoroborate (SBP-BF4), preferably between 1 and 5.5 mol, more preferably 1.5 mol of the quaternary ammonium salt based on spiro-(1,1')-bipyrolidinium tetrafluoroborate (SBP-BF4) dissolved in the anhydrous propylene carbonate and anhydrous dimethyl carbonate.

IN ACCORDANCE WITH A FOURTH ASPECT OF THE INVENTION THERE IS PROVIDED a process for producing an electrode, the process comprising:

in a wet nanocomposite material application stage, applying on at least one surface of a substrate a wet nanocomposite material comprising nanoparticles of carbon nanotubes and transitional metal oxide nanoparticles, wherein the transitional metal oxide nanoparticles are selected from a group of lanthanide oxides, and in a curing stage, curing the wet nanocomposite material, thus forming a cured nanocomposite material, wherein the cured nanocomposite material comprises interstices having a size that is equivalent to the size of ions of an electrolyte suitable for use with the surface modified electrode.

The group of lanthanide oxides nanoparticles may include cerium oxide nanoparticles, preferably of a particle size of 5 to 25 nm.

The substrate may be in the form of a foil or flat sheet that has a first surface and an opposite second surface. The substrate may comprise substantially of aluminium (Al), gold (Au), silver (Ag), copper (Cu), nickel (Ni), platinum (Pt), or palladium (Pd), preferably aluminium.

At least one of the first and second surfaces of the substrate may be oxidized, in particular the aluminium foil may have an oxidized surface layer on at least one of its surfaces.

The substrate may have a thickness of about 0.01 mm.

The carbon nanotubes (CNTs) may be short length CNTs of 0.5 to 100 micrometres, preferably 10 to 50 micrometres.

The carbon nanotubes may be single layer carbon nanotubes (SLCNTs) or multilayer carbon nanotubes (MLCNTs) (i.e. multiwalled carbon nanotubes (MWCNTs)).

Prior to applying the wet nanocomposite material onto the substrate, the process may comprise, in a mixing stage, a nanocomposite material wet synthesis step, comprising mixing, in particular wet mixing, a predefined amount (e.g. by mass) of nanoparticles of carbon nanotubes and transitional metal oxides with a matrix that is a predefined fraction of the total mass of the carbon nanotubes and transitional metal oxides nanoparticles.

The matrix may further comprise a stabilizing agent comprising polyethylene oxide or carboxymethyl cellulose (CMC), or the combination of both.

The stabilizing agent may be added to the PEDOT:PSS, and the amount of stabilizing agent added to the PEDOT:PSS may be about 5 wt % of the total weight of the CNTs, $CeO_2$ and PEDOT:PSS.

In particular, between about 50-90 wt % of nanoparticles of CNTs and 10 to 50 wt % nanoparticles of $CeO_2$ may be added to the matrix, preferably PEDOT:PSS, wherein the mass of the PEDOT:PSS that is mixed with the nanoparticles of the carbon nanotubes and $CeO_2$ may be between about 0.5 to 8 wt % the total mass of the nanoparticles of CNTs and $CeO_2$.

More specifically, between about 65 to 75 wt % of carbon nanotubes and 25 to 35 wt % $CeO_2$ nanoparticles may be added to PEDOT:PSS, wherein the mass of the PEDOT: PSS that is mixed with the carbon nanotubes and $CeO_2$ may be between about 1 to 3 wt % the total mass of the nanoparticles of the CNTs and $CeO_2$.

In forming the nanocomposite material, the CNTs, PEDOT:PSS, and the $CeO_2$ may be mixed under a vacuum, nitrogen environment or under atmospheric conditions.

The mixing may be performed for a period of about 30 minutes to 24 hours at a temperature of about 20° C. to 40° C.

The mixing may be conducted using intensive mixers, planetary mixers, dispersers, and the like.

The step of applying the nanocomposite material onto the substrate may include depositing, in a nanocomposite material application stage (i.e. a coating or deposition stage), the nanocomposite material onto a surface of the substrate.

The application of the nanocomposite material may be by means of ultrasonic spraying or paste application (including slot die, doctor blade, anilox roller paste application methods).

The application may be effected in a manner such that the particle size of the CNTs and $CeO_2$ nanoparticles is not affected during application.

The curing of the wet nanocomposite material, in the curing stage, may occur at a temperature of 50 to 250° C. for a predefined period, preferably up to 24 hours, to ensure that the cured nanocomposite material is substantially devoid (i.e. free) of moisture.

The process further includes compressing, in a compressing stage, the substrate comprising the cured nanocomposite material.

The compressing of the substrate comprising the cured nanocomposite material may be effected through a set of rollers which are arranged to compress the substrate comprising the cured nanocomposite material.

The thickness of the nanocomposite material, after compression, may be up to 150 micrometres, but preferably between 80 to 120 micrometres, more preferably 100 micrometres.

The nanocomposite material as deposited, cured, and compressed on the substrate may have a random/irregular arrangement of CNTs.

In particular, the CNTs may be entangled and the $CeO_2$ may be embedded on the surface of the CNTs and penetrate through the CNTs.

The nanoparticles of $CeO_2$ may be heterogeneously dispersed/arranged on the CNTs, with some areas on the CNTs being concentrated with, or having clusters/agglomerates of $CeO_2$ nanoparticles and other areas being less concentrated with, or having fewer clusters of, nanoparticles of $CeO_2$.

The process further includes a step of punching out or cutting out, in a punching stage, the substrate comprising the cured nanocomposite material, thus forming the electrode.

The process may further include the step of attaching a tab/conductor, in a tab attachment stage, onto the electrode.

IN ACCORDANCE WITH A FIFTH ASPECT OF THE INVENTION THERE IS PROVIDED a capacitor comprising an electrode according to the third aspect of the invention or produced according to the process of the fourth aspect of the invention.

IN ACCORDANCE WITH A SIXTH ASPECT OF THE INVENTION THERE IS PROVIDED an supercapacitor, in particular an ultracapacitor, comprising at least one electrode of the third aspect of the invention or produced in accordance with the process of the fourth aspect of the invention.

IN ACCORDANCE WITH A SEVENTH ASPECT OF THE INVENTION THERE IS PROVIDED a method of modifying an electrode, the method comprising:
 applying a wet nanocomposite material comprising a matrix and nanoparticles of carbon nanotubes and transitional metal oxides selected from a group of lanthanide oxides, on an existing electrode; and
 curing the wet nanocomposite material, wherein after curing, the nanocomposite material (i.e. cured nanocomposite material) has interstices having a size that is equivalent to the size of ions of an electrolyte suitable for use with the electrode.

The step of applying the nanocomposite material, on the existing electrode may be preceded by the step of activating an external surface of the electrode, for example, by oxidizing at least one surface of the electrode.

IN ACCORDANCE WITH AN EIGHTH ASPECT OF THE INVENTION THERE IS PROVIDED a supercapacitor, in particular an ultracapacitor comprising:
 a first electrode and a second electrode, at least one of the first and second electrodes having a surface comprising a nanocomposite material comprising a matrix and nanoparticles of carbon nanotubes and transitional metal oxides selected from a group of lanthanide oxides.

The ultracapacitor may comprise a separator fitted between the first and second electrodes.

The ultracapacitor may include an electrolyte comprising a quaternary ammonium salt based on spiro-(1,1')-bipyrolidinium tetrafluoroborate (SBP-BF4).

The quaternary ammonium salt based on spiro-(1,1')-bipyrolidinium tetrafluoroborate (SBP-BF4) may be anhydrous.

The electrolyte may comprise a solvent for the anhydrous spiro-(1,1')-bipyrolidinium tetrafluoroborate (SBP-BF4).

The solvent for spiro-(1,1')-bipyrolidinium tetrafluoroborate (SBP-BF4) may be a polar solvent comprising anhydrous propylene carbonate and/or dimethyl carbonate.

The spiro-(1,1')-bipyrolidinium tetrafluoroborate (SBP-BF4) may be in the form of up to a substantially near saturated spiro-(1,1')-bipyrolidinium tetrafluoroborate (SBP-BF4) in the electrolyte and may be in the form of spiro-(1,1')-bipyrolidinium tetrafluoroborate (SBP-BF4) dissolved in the polar solvent.

BRIEF DESCRIPTION OF DRAWINGS

The objects of this invention and the manner of obtaining them, will become more apparent, and the invention itself will be better understood, by reference to the following description of embodiments of the invention taken in conjunction with the accompanying diagrammatic drawings, wherein.

DETAILED DESCRIPTION OF AN EXAMPLE EMBODIMENT

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances and are a part of the present invention. Thus, the following description is provided as illustrative of the principles of the present invention and not a limitation thereof.

The invention extends to a method of producing an electrode that has an improved energy density capacity. The electrode comprises a metal or alloy substrate and a nanocomposite material acting as an active layer of the electrode, the nanocomposite material extends from a surface of the metal or alloy substrate.

The starting materials for producing the active layer (i.e. nanocomposite material) and the electrode are provided below. The method of assembling an ultracapacitor is also provided below.

Starting Materials
  a) An electrode substrate in the form aluminium foil was provided. The foil had a first surface and a second surface, and one of the surfaces was oxidized. The foil had a thickness of about 0.01 mm.
  b) Carbon nanotubes and nanoparticles of cerium oxide of preferred sizes were also provided. The carbon nanotubes were short length CNTs of 0.5 to 50 micrometres (in length) and had an outside diameter of between about 5 to 15 nm. The carbon nanotubes were a combination of single layer carbon nanotubes (SLCNT) and multilayer carbon nano tubes (MLCNT). The cerium oxide nanoparticles had an average particle size range of between 5 to 25 nm.
  c) A polymer matrix comprising poly(3,4-ethylenedioxythiophene) polystyrene sulfonate and a stabilizing agent comprising polyethylene oxide or carboxymethyl cellulose (CMC) were also provided.

Method

Figure 1:
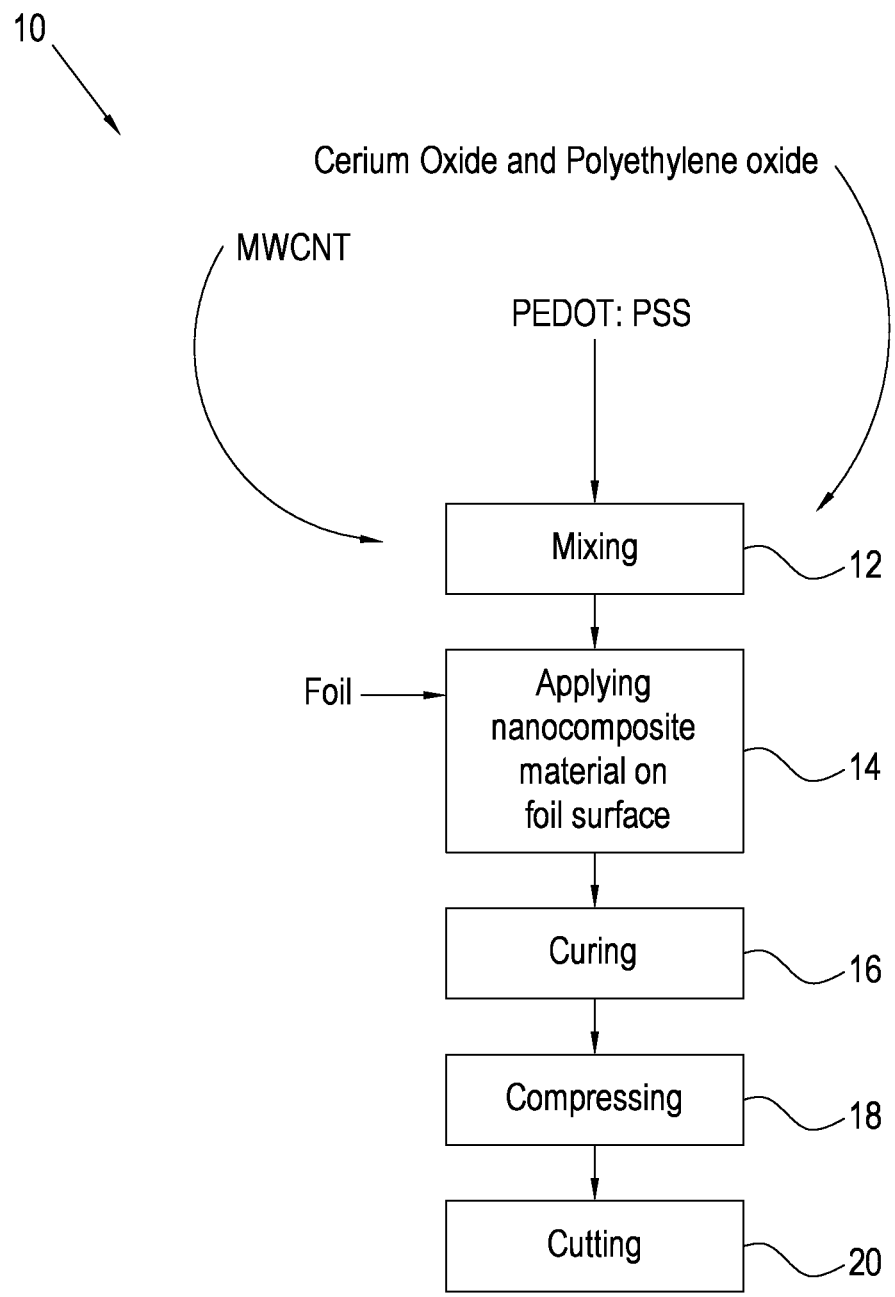
FIG. 1 shows a flow diagram including steps followed in the process of producing an electrode, in accordance with a method of the invention.

A method of producing a nanocomposite material and an electrode comprising a nanocomposite material is shown in FIG. 1 and designated generally by reference numeral 10.

The method 10 includes wet mixing, in a mixing stage 12, preferably in a planetary mixer, the carbon nanotubes and cerium oxide nanoparticles along with the poly(3,4-ethylenedioxythiophene) polystyrene sulfonate and one of polyethylene oxide or organic cellulose comprising sodium carboxymethyl cellulose (CMC), thus forming a slurry/paste of a nanocomposite material.

In particular, a dry mixture of CNTs and cerium oxide nanoparticles were mixed with the binder (i.e. poly(3,4-ethylenedioxythiophene) polystyrene sulfonate) and the stabilizing agent, in the mixing stage 12, under vacuum. It is envisaged that the mixing could also be effected in a nitrogen environment or under atmospheric conditions at room temperature and pressure (i.e. atmospheric pressure).

The mass percentage of the starting materials utilized and mixed in the mixing stage was as follows: CNTs 50 to 90 wt. % and $CeO_2$ 10 to 50 wt. %. The poly(3,4-ethylenedioxythiophene) polystyrene sulfonate into which the CNTs and $CeO_2$ were added was about 0.5 to 8 wt. % of the total weight of the dry mixture comprising CNTs and $CeO_2$.

More specifically, the mass percentage of the starting materials utilized and mixed in the mixing stage 12 was as follows: CNTs between 65 to 75 wt. % and $CeO_2$ between 25 to 35 wt. %. The poly(3,4-ethylenedioxythiophene) polystyrene sulfonate into which the CNTs and $CeO_2$ were added was about 1 to 3 wt. % of the total weight of the dry mixture comprising CNTs and $CeO_2$.

Prior to mixing the CNTs and $CeO_2$ nanoparticles with the poly(3,4-ethylenedioxythiophene) polystyrene sulfonate, the stabilizing agent (i.e. polyethylene oxide or carboxymethyl cellulose (CMC)) was added into the poly(3,4-ethylenedioxythiophene) polystyrene sulfonate. The polyethylene oxide or carboxymethyl cellulose (CMC) added into the poly(3,4-ethylenedioxythiophene) polystyrene sulfonate was about 5 wt. % of the total weight of the CNTs, $CeO_2$, and poly(3,4-ethylenedioxythiophene) polystyrene sulfonate.

The wet mixing was effected in the mixing stage 12 for a period of 30 minutes to 24 hours at a temperature of between 20° C. and 40° C.

During mixing, a homogeneous coating paste (i.e. slurry) comprising of the nanocomposite material (i.e. a wet nanocomposite material) was produced.

The method 10 then extended to the step of applying, in a nanocomposite material application stage (i.e. a coating or deposition stage) 14, the homogenous coating paste comprising of the nanocomposite material onto the surface of the foil.

The application technique used in depositing the coating paste onto the surface of the substrate, in particular on the oxidized layer of the foil, included ultrasonic spraying or paste application (e.g. using a slot die, doctor blade, or anilox roller). It will be appreciated that the nanocomposite material could also be applied on both surfaces of the foil.

The deposition of the coating paste onto the foil resulted in a coating layer on the foil having a layer thickness of up to 120 micrometres. In some instances, the thickness of the coating ranged between 90 to 110 micrometres, and in other instances, during production of other electrodes, the thickness was around 110 micrometres.

The method 10 further included the step of curing the coating, in a drying/curing stage 16, of the coating layer on the foil.

The curing was effected at a temperature of between about 50 and 250° C. for up to 24 hours, to ensure that the coating comprising of the nanocomposite material was substantially free of moisture and the matrix was substantially solidified.

After the curing of the coating comprising the nanocomposite material on the surface of the foil, the method 10 included the step of compressing or calendarizing, in a compression stage 18, the foil comprising the cured coating comprising the nanocomposite material.

After compression, the method 10 included punching or cutting out, in a punching stage 20, an electrode from the foil comprising the coating comprising the nanocomposite material.

The electrode was subjected to microscopy analysis to assess the morphology of the nanocomposite material formed on the surface of the foil. The results revealed a general spongy morphology of the carbon nanotubes with an irregular and entangled arrangement as illustrated by Scanning Electron Microscopy (SEM) images shown in FIG. 2. Visible agglomerates of the irregular entanglement/networks of the carbon nanotubes were observed. The agglomerates appear to be interconnected/tightly packed together and consistently laid across the active layer resulting in a uniform surface. Therefore, the nanotubes do not have either horizontal or vertical alignment.

Figure 2:
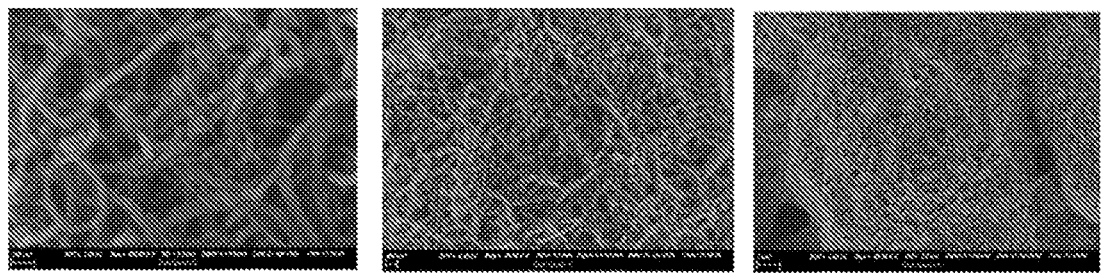
FIG. 2 shows SEM images of a nanocomposite material produced in accordance with a method of the invention.
Figure 3:
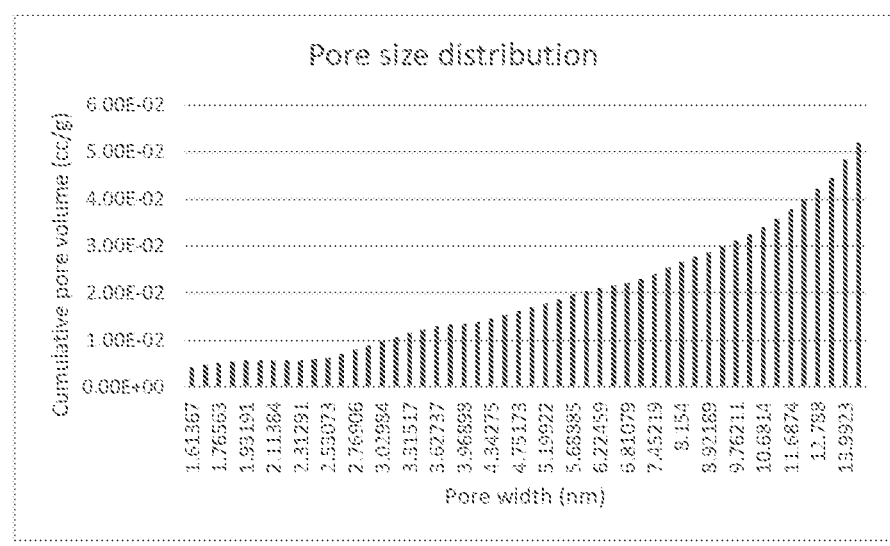
FIG. 3 shows a pore size distribution of a nanocomposite material produced in accordance with the invention.

The surface of the nanocomposite material further revealed pores/cavities as well as surface cracks. As seen in FIG. 2, the irregular arrangement of the carbon nanotubes morphology is spongy in nature and that means the agglomerates are porous even at nano size level. The accurate determination of the pore sizes was achieved using the Nitrogen ($N_2$) Physisorption method inculcating the Brunauer-Emmer-Teller (BET) method. The pores showed a narrower size distribution as illustrated by the BET results with the pore size ranging between 1.61 nm and 14.64 nm, as shown in the pore size distribution diagram in FIG. 3.

Visible attachments on the metal oxide nanoparticles were also observed within the nanotubes entanglement in no particular order or distribution. From the surface view of the SEM, the metal oxide nanoparticles appeared to be both within the carbon nanotubes and in some, around the carbon nanotubes in aggregates. In some areas of the surface of the active layer, very high visibility of the metal oxide was observed compared to the other areas of the nanotubes. It is worth noting that, the interaction volume of the in-lens detector is very low and thus only detection in this case is limited to utmost surface information.

Figure 4:
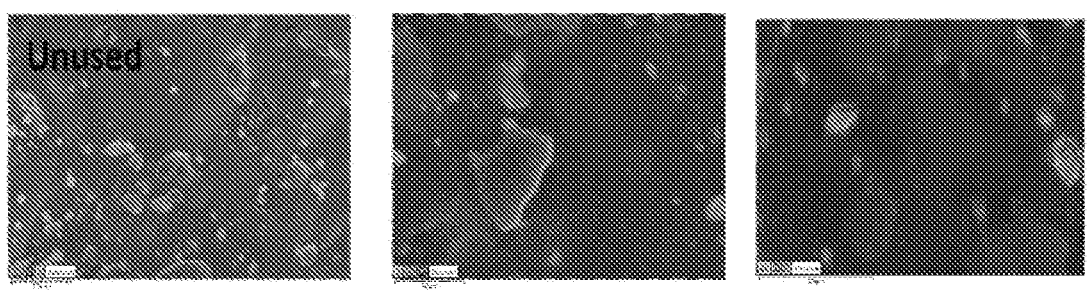
FIG. 4 shows EDX images of a nanocomposite material produced in accordance with a method of the invention.
Figure 5:
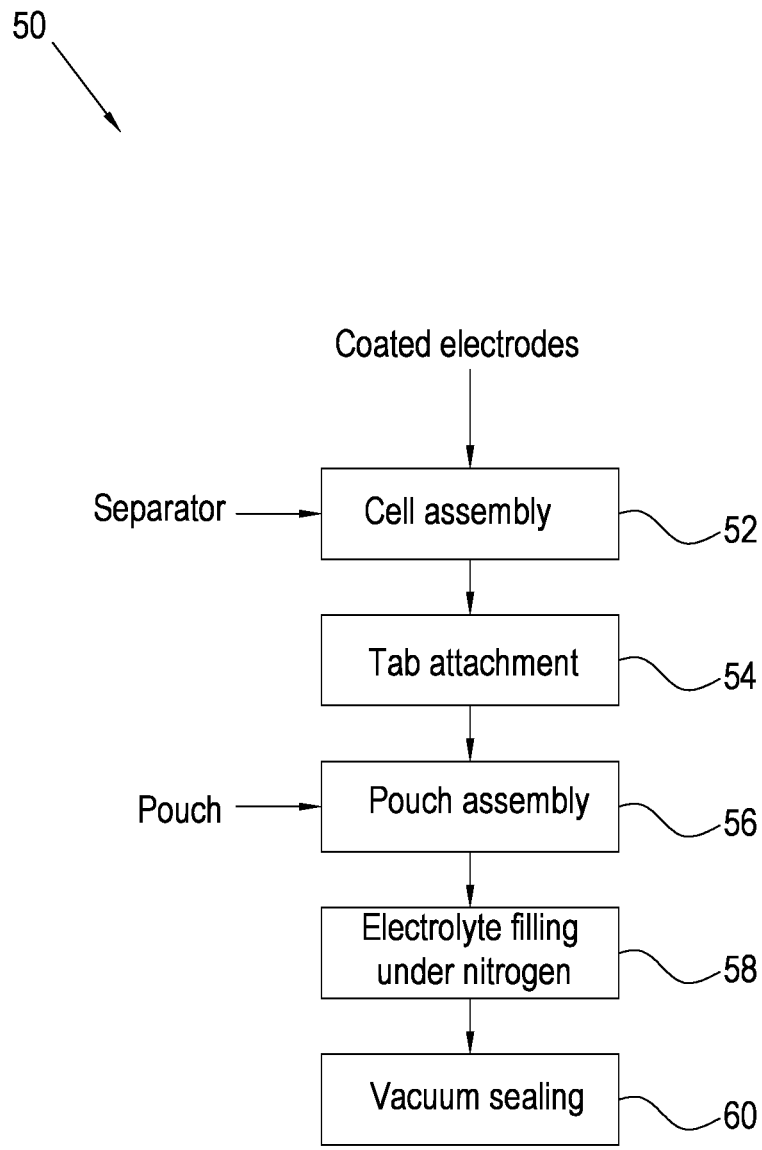
FIG. 5 shows a flow diagram including steps followed in the process of assembling an ultracapacitor, in accordance with a method of the invention.

FIG. 4 shows superimposed maps of secondary electron images of an unused electrode, the electrode comprised of cerium (Ce) and oxygen (O) (represented in a light grey colour) and carbon (C) (represented in a dark grey colour). The distributions of cerium and oxygen is reflected by the light grey traces on the dark grey carbon nanotubes in the maps. Obvious agglomerates of the metal oxide over the active layer were observed and were not uniform. The elemental composition of these maps is presented in Table 1.

TABLE 1

Elemental composition in percentage weight of the three analyzed sites of the unused electrode.

| Element | Site 1 wt % | Site 2 wt % | Site 3 wt % |
| --- | --- | --- | --- |
| C | 76.1 | 83.3 | 76.5 |
| Ce | 10.36 | 9.5 | 11.5 |
| O | 11.4 | 5.1 | 10.1 |
| S | 1.27 | 1.2 | 1.1 |
| Ni | 0.87 | 0.9 | 0.8 |
| Al | — | — | — |

Quantitatively, carbon, cerium and oxygen dominates with average values of 78.6, 10.5 and 8.9 weight percentage, respectively. This was expected, as these elements are the main contents of the active layer (i.e. nanocomposite material) made of carbon nanotubes and the metal oxide nanoparticles. Additionally, traces of sulfur (S) and nickel (Ni) were also detected at an average amount of 1.19 and 0.86 weight percent, respectively. The nickel could be residue from a catalyst, normally used during synthesis of the carbon nanotubes and sulfur from the active layer processing. It is worth noting that the interaction volume at 15 kV (of beam electrons of the SEM) is higher and thus the cerium oxide in this case, is accounted from a few microns deeper into the active layer. From this perspective, the quantitative values in Table 1 are more consistent across the active layer than what appears from the surface analysis. The fact that the aluminum (Al) is beyond the EDX detection in spite of the pores/cavities and cracks, alludes to the result of the tightly packed arrangement of the nanotubes, as discussed in FIG. 2 thus confirming a more solid active layer.

The invention further extends to a method of assembling an ultracapacitor 50 to form an ultracapacitor. The method includes the step of assembling a cell 52 which includes alternately stacking, in a stacking stage, electrodes, at least one of which being an electrode produced by the method 10 and separating the electrodes by a separator.

The separator may be cut to the same size or slightly larger than the electrodes, but more likely it is applied in a long strip wound in a zig zag fashion between alternate electrodes in the stack of electrodes.

The method 50 further includes attaching a tab, in a tab attachment stage 54, onto each one of the electrodes.

The method 50 further includes the step of providing a pouch/container. The method further includes assembling the pouch and a cell comprising the alternating electrodes separated by the separator, in a pouch assembly stage 56, wherein the assembling includes inserting the cell, in the pouch, under a nitrogen environment.

The method 50 further includes the step of filling an electrolyte, in an electrolyte filling stage 58, between the separator and electrodes. The filling of the electrolyte may be performed under vacuum or a nitrogen environment.

The electrolyte filled in the pouch consists of a up to near saturated, anhydrous spiro-(1,1')-bipyrolidinium tetrafluoroborate (SBP-BF4) in a polar solvent, namely anhydrous propylene carbonate and/or dimethyl carbonate. For a solid-state variant of the ultracapacitor, PEDOT:PPS or polypropylene carbonate or butylene carbonate is utilized with appropriate drying and curing under vacuum and nitrogen environment.

The method 50 further includes the step of sealing the pouch, in a pouch sealing stage 60, under a nitrogen or argon gas environment, such that the tabs stick out of, or protrude outwardly from, the pouch.

It will be appreciated that the tabs attachment stage may occur after the sealing stage 60, in which the tabs are attached to the electrodes after the sealing of the pouch.

Discussion

The inventors have identified that most studies have shown that standard activated carbon ultracapacitors store electrons only in the space that are the same size as the electrons utilized, the rest of the area acts only as channels for the electrons. Therefore, typically more than 90% of the mass utilized is not used for storage. The inventors have identified that other inventors in this field who have tried utilizing graphene electrodes have experienced good results but have seen a radical decline of capacity over cycles due to restacking of graphene back to graphite.

The inventors have accordingly overcome this problem by combining carbon nanotubes (CNTs) with cerium oxide ($CeO_2$) nanoparticles (i.e. lanthanide oxide nanoparticles) to give rise to an electron storage layer (i.e. nanocomposite material) that remains stable and does not degrade over time or cycles.

Accordingly, the invention as described above relates to an electrode comprising an active layer (i.e. an electron storage layer) that comprises carbon nanotubes (CNTs) with cerium oxide ($CeO_2$) nanoparticles which have voids distributed throughout the nanocomposite material. The voids are sized and dimensioned to be of the same size as the ions, in particular to be larger than the size of the ions, in an electrolyte that will be used and suitably matched with the electrode comprising the active layer. The fractionally larger size of the voids ensures that the ions can penetrate the active layer (i.e. nanocomposite material) and accordingly pass through the active layer. This means that when an electric current is passed through the electrode, ions that substantially have the same density as the size of the pores/voids in the active layer will be attracted and adsorbed into the voids.

The inventors have found out that the use of the optimum ratio of the starting materials, as described above, yields an active layer that has high porosity, mechanical stability and excellent conducting properties.

The electrode of the present invention provides pseudo-capacitance and is fundamentally different from an electric double layer capacitor in the way in which charge is stored. Faradaic pseudo-capacitance arises from electro-sorption of proton monolayers on and electrochemical protonation of the cerium oxide. The pseudo-capacitance behaviour of cerium oxide stores charge using redox-based Faradaic reactions. This pseudo-capacitance is superimposed on the electric double-layer capacitance. The utilization of pseudo-capacitance can provide a higher energy density than other inventions, especially due to the multiple oxidation states that are accessed. Reversible redox processes take place in which the valence electrons of electroactive materials are transferred across the electrode/electrolyte interface, resulting in a potential-dependent capacitance.

The inventors have identified that typically several types of Faradaic processes occur in the pseudo-capacitive electrode of the present invention, namely:
Reversible surface adsorption of ions from the electrolyte
Redox reactions involving ions from the electrolyte
Reversible doping de-doping processes in the PEDOT: PSS.

The first two processes are primarily surface reactions and hence are highly dependent on the surface area of the electrodes. The surface area is enhanced by the combination of CNTs and $CeO_2$ nanoparticles in the invention specifically the size of the nanoparticles of the CNTs and $CeO_2$.

In the third process a relatively high Brunauer-Emmett-Teller (BET) surface area of about 65 to 2300 $m^2/g$ with micropores and mesopores having a size in the range of 1.6 nm to 13.9 nm is desirable to distribute the ions efficiently to and from the electrodes. This is achieved by the size and ratio of the primary materials as well as the application method to ensure the formation of pores having a pore diameter size of 1.6 to 13.9 nm (as evidenced by the pore size distribution diagram of FIG. 3) on the surface and throughout the thickness of the active layer. This ensures the optimum sites to store electrons in the lowest weight ratio possible.

While the invention has been described in detail with respect to a specific embodiment and/or example thereof, it will be appreciated that those skilled in the art, upon attaining an understanding of the foregoing may readily conceive of alterations to, variations of and equivalents to these embodiments.

The invention claimed is:

1. A nanocomposite material comprising a dispersion of carbon nanotubes and nanoparticles of transitional metal oxides in a conductive polymer matrix, wherein the transitional metal oxides are selected from a group of lanthanide oxides, and wherein the nanocomposite material has a plurality of pores which are sized and dimensioned to allow ions in an electrolyte to penetrate and pass through the nanocomposite material, in use.

2. The nanocomposite material according to claim 1, wherein the conductive polymer matrix is selected from polyacetylene, polypyrrole, polyindole, polyaniline, polymer mixtures of at least two ionomers, and copolymers thereof.

3. The nanocomposite material according to claim 1, wherein the conductive polymer matrix is a polymer mixture comprising (3,4-ethylenedioxythiophene) polystyrene sulfonate (PEDOT:PSS).

4. The nanocomposite material according to claim 1, wherein the conductive polymer matrix optionally comprises a stabilizing agent comprising polyethylene, an organic cellulose comprising sodium carboxymethyl cellulose (CMC), or a mixture of polyethylene and an organic cellulose comprising sodium carboxymethyl cellulose (CMC).

5. The nanocomposite material according to claim 1, wherein the lanthanide oxide is cerium oxide ($CeO_2$).

6. The nanocomposite material according to claim 5, comprising between 50-90 wt % of carbon nanotubes and 10 to 50 wt % of nanoparticles of $CeO_2$, and the conductive polymer matrix is between 0.5 to 8 wt % the total mass of the carbon nanotubes and nanoparticles of $CeO_2$.

7. The nanocomposite material according to claim 5, comprising between 65 to 75 wt % of carbon nanotubes and 25 to 35 wt % of nanoparticles of $CeO_2$, and the conductive polymer matrix is between 1 to 3 wt % the total mass of the carbon nanotubes and nanoparticles of $CeO_2$.

8. The nanocomposite material according to claim 1, has a BET specific surface area of between 65 $m^2/g$ and 2300 $m^2/g$.

9. The nanocomposite material according to claim 1, wherein the plurality of pores have an average diameter size that ranges between 0.2 and 20 nm.

10. The nanocomposite material according to claim 1, wherein the plurality of pores have an average diameter size that ranges between 1 and 15 nm.

11. The nanocomposite material according to claim 1, wherein the nanoparticles of lanthanide oxides have a particle size of between 5 nm and 25 nm.

12. The nanocomposite material according to claim 1, wherein the carbon nanotubes have an outside diameter of between 5 nm and 15 nm.

13. The nanocomposite material according to claim 1, wherein the length of the carbon nanotubes is between 0.5 micrometers and 100 micrometers.

14. The nanocomposite material according to claim 1, wherein the length of the carbon nanotubes is between 10 micrometers and 50 micrometers.

15. The nanocomposite material according to claim 1, comprising an arrangement of irregular and entangled carbon nanotubes, and a heterogenous arrangement of clusters of the lanthanide oxides.

16. A supercapacitor comprising
a first electrode and a second electrode, at least one of the first and second electrodes having at least one surface comprising a nanocomposite material comprising a dispersion of carbon nanotubes and nanoparticles of transitional metal oxides incorporated in a conductive polymer matrix, wherein the transitional metal oxides are selected from a group of lanthanide oxides, and wherein the nanocomposite material has a plurality of pores which are sized and dimensioned to allow ions in an electrolyte to penetrate and pass through the nanocomposite material, in use.

17. The supercapacitor according to claim 16, comprising a separator fitted between the first and second electrodes and an electrolyte, wherein the electrolyte comprising a quaternary ammonium salt based on spiro-(1,1')-bipyrolidinium tetrafluoroborate (SBP-BF4).

18. The supercapacitor according to claim 17, wherein quaternary ammonium salt based on spiro-(1,1')-bipyrolidinium tetrafluoroborate (SBP-BF4) is anhydrous.

19. The supercapacitor according to claim 18, wherein electrolyte comprises a solvent for the anhydrous spiro-(1,1')-bipyrolidinium tetrafluoroborate (SBP-BF4).

20. The supercapacitor according to claim 19, wherein the solvent for spiro-(1,1')-bipyrolidinium tetrafluoroborate (SBP-BF4) is a polar solvent comprising anhydrous propylene carbonate and/or dimethyl carbonate.

21. The supercapacitor according to claim 16, wherein the conductive polymer matrix is selected from polyacetylene, polypyrrole, polyindole, polyaniline, polymer mixtures of at least two ionomers, and copolymers thereof.

22. The supercapacitor according to claim 21, wherein the conductive polymer matrix is a polymer mixture comprising (3,4-ethylenedioxythiophene) polystyrene sulfonate (PEDOT:PSS).

23. The supercapacitor according to claim 16, wherein the conductive polymer matrix optionally comprises a stabilizing agent comprising polyethylene, or an organic cellulose comprising sodium carboxymethyl cellulose (CMC), or a mixture of polyethylene and an organic cellulose comprising sodium carboxymethyl cellulose (CMC).

24. The supercapacitor according to claim 16, wherein the lanthanide oxide is cerium oxide ($CeO_2$).

25. The supercapacitor according to claim 24, wherein the nanocomposite material comprises between 50-90 wt % of carbon nanotubes and 10 to 50 wt % of nanoparticles of $CeO_2$, and the conductive polymer matrix is between 0.5 to 8 wt % the total mass of the carbon nanotubes and nanoparticles of $CeO_2$.

26. The supercapacitor according to claim 24, wherein the nanocomposite material comprising between 65 to 75 wt % of carbon nanotubes and 25 to 35 wt % of nanoparticles of $CeO_2$, and the conductive polymer matrix is between 1 to 3 wt % the total mass of the carbon nanotubes and nanoparticles of $CeO_2$.

27. The supercapacitor according to claim 16, wherein the nanocomposite material has a BET specific surface area of between 65 $m^2/g$ and 2300 $m^2/g$.

28. The supercapacitor according to claim 16, wherein the plurality of pores comprises a mixture of micropores and mesopores.

* * * * *